United States Patent [19]

Diez

[11] 4,255,843
[45] Mar. 17, 1981

[54] THERMOWELD INSERTION DEVICE

[76] Inventor: L. J. Diez, 120 Park Dr., Gonzales, La. 70737

[21] Appl. No.: 1,426

[22] Filed: Jan. 8, 1979

Related U.S. Application Data

[63] Continuation-in-part of Ser. No. 933,195, Aug. 14, 1978, abandoned.

[51] Int. Cl.³ .............................................. B23P 19/04
[52] U.S. Cl. ..................................................... 29/256
[58] Field of Search .................... 29/256, 213; 137/318

[56] References Cited

U.S. PATENT DOCUMENTS

| | | | |
|---|---|---|---|
| 2,770,532 | 11/1956 | Mason | 29/213 |
| 2,870,629 | 1/1959 | Willis | 29/213 |
| 2,972,915 | 2/1961 | Milanovits et al. | 137/318 |

Primary Examiner—James L. Jones, Jr.

[57] ABSTRACT

A thermoweld insertion device connectable to a pipe comprising a coupling means attachable to the pipe and having a sealable passageway extending through the coupling means and connecting with an opening in the pipe, and a thermoweld insertion support assembly comprising an outer hollow casing attachable to the coupling means, an inner hollow casing adjustably positionable inside said hollow casing and a thermoweld positioning rod insertable in the inner casing and extendable to the thermoweld coupling.

1 Claim, 3 Drawing Figures

THERMOWELD INSERTION DEVICE

RELATED APPLICATIONS

This application is a continuation-in-part of United States patent application Ser. No. 933,195, entitled "Thermoweld Holder Device Attachable to Pipe", filed Aug. 14, 1978, by the inventor herein, now abandoned, and mention is made for purposes of obtaining benefit of its earlier filing date.

BACKGROUND OF THE INVENTION

1. Field of the Invention

This invention relates to devices for field insertion of thermowelds in pipes.

2. Prior Art

In many industrial situations, it is necessary to monitor the temperature of a fluid being transported through a pipeline. This is presently being done by permanently attached thermowelds which extend into the pipe sections. Difficulties are incurred when thermowelds wear out or become broken. Presently, the only means to replace these thermowelds is to shut down the flow of fluids through the pipeline, tape into the pipeline and permanently weld another thermoweld into position. Such a procedure is not only time consuming and expensive, but can be dangerous, depending upon the explosive nature of the fluid which had been transported.

Another problem is the proper positioning of the thermoweld inside the pipe in order that accurate readings can be taken.

SUMMARY OF THE INVENTION

Therefore, one object of this invention is to provide a device which allows insertion of a thermoweld into a pipeline without having to stop the flow of materials into the pipeline.

Another object of the invention is to provide a device for safely inserting a thermoweld into a pipeline transporting explosive materials.

Still another object is to provide a device for accurately positioning a thermoweld into a pipe.

These and other objects and advantages of this invention shall become apparent from the ensuing description of the invention.

Accordingly, a device for inserting a thermoweld into a pipe cavity is provided comprising a coupling means attachable to the pipe and having a sealable passageway of sufficient size to allow a thermoweld to pass through connecting to the pipe cavity, and a thermoweld insertion support assembly having an outer hollow casing attachable to the coupling means, an inner hollow casing adjustably positionable inside the outer casing and a thermoweld positioning rod insertable into the inner casing and extendable to the coupling means.

PREFERRED EMBODIMENTS OF THE INVENTION

Figure 1:
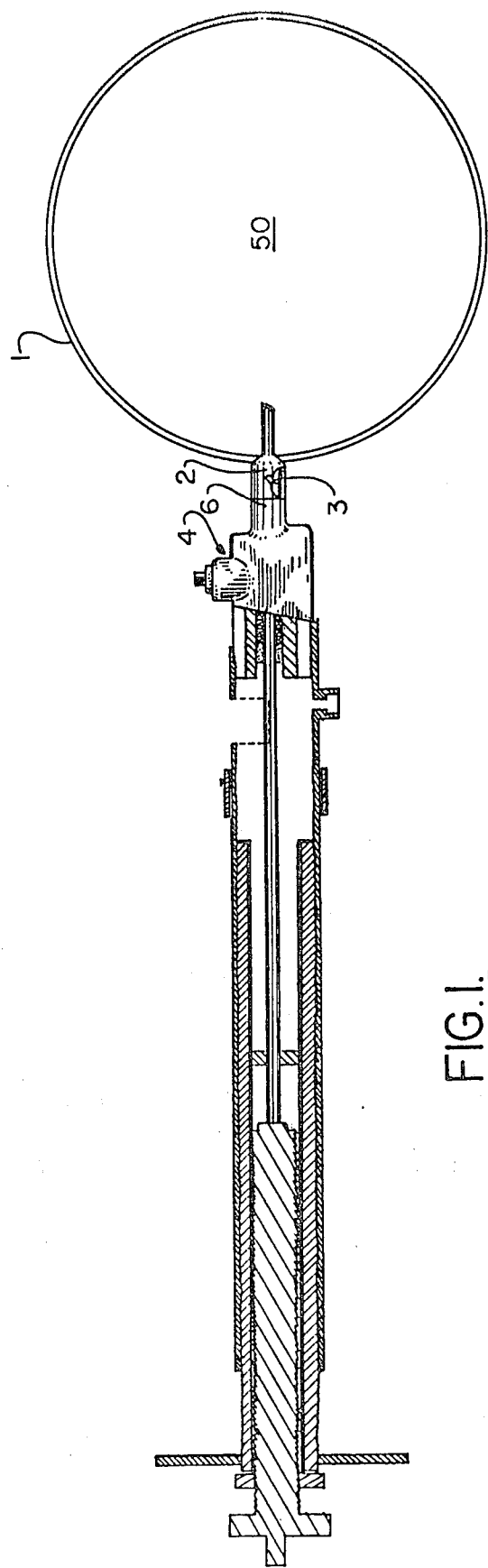
FIG. 1 is a cutaway perspective view of one preferred embodiment of the thermoweld insertion device of this invention attached to a pipe.

The device of this invention is designed to be utilized on a pipe section 1, as seen in FIG. 1, which has been provided for a welded pipe stud 2 having a threaded outer surface 3 to which the coupling means 4 can be attached by screwing its threaded end 6 onto pipe stud 2, as shown.

Figure 2:
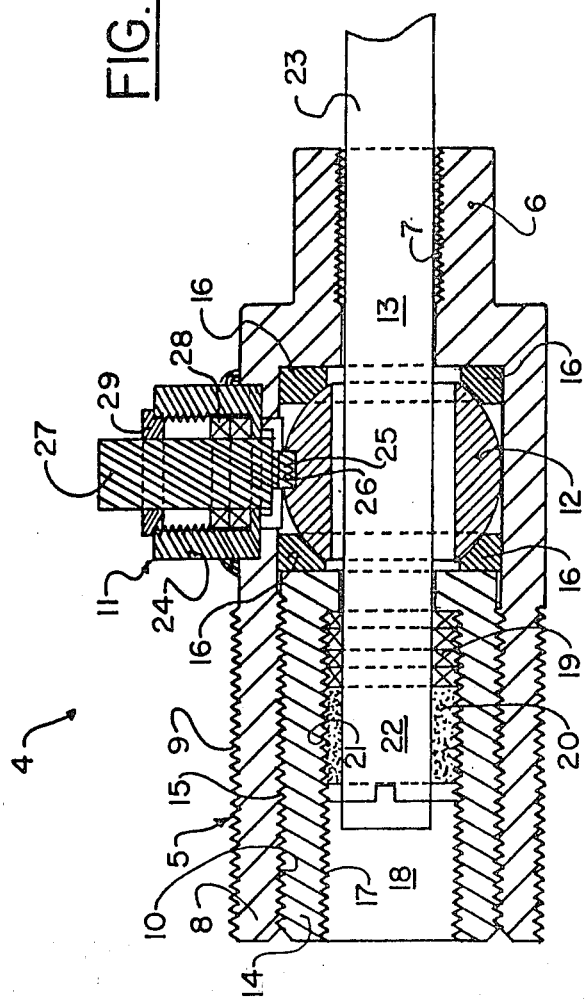
FIG. 2 is a cross-sectional view of a preferred embodiment of the coupling means of this invention.

The coupling means 4, shown in FIG. 2, comprises a metal outer shell 5 having one end 6 provided with inner threads 7 and its opposite end 8 provided with exterior threads 9 and interior threads 10. Outer shell 5 is provided with an opening into which valve stem housing 11 can fit and connect to a ball valve 12 located in the thermoweld passageway 13, extending through coupling means 4. Coupling means 4 is also provided with a valve seat retainer 14 having exterior threads 15 for screwing to the interior threads 10 of end 8. Valve seat retainer 14 extends to and presses against valve seat 16 positioned about ball valve 12 so as to hold ball valve 12 rigidly into position. Valve seat retainer 14 is also provided with inner threads 17 extending down the length of its passageway 18 into which can be inserted packing material 19 held in place by packing gland nut 20 that is provided with outer threads 21 that mate with threads 17 of valve seat retainer 14, as shown. Packing gland nut 20 is also provided with passageway 22 having a diameter the same as that of thermoweld rod 23 so that a sealing arrangement is achieved by packing material 19 pressing against thermoweld rod 23, as shown.

The valve stem housing 11 is constructed with an outer casing 24 provided with a key 25 which fits into ball valve slot 26 and is rotatable by valve stem 27 that is secured in position by packing material 28 and packing gland nut 29.

Figure 3:
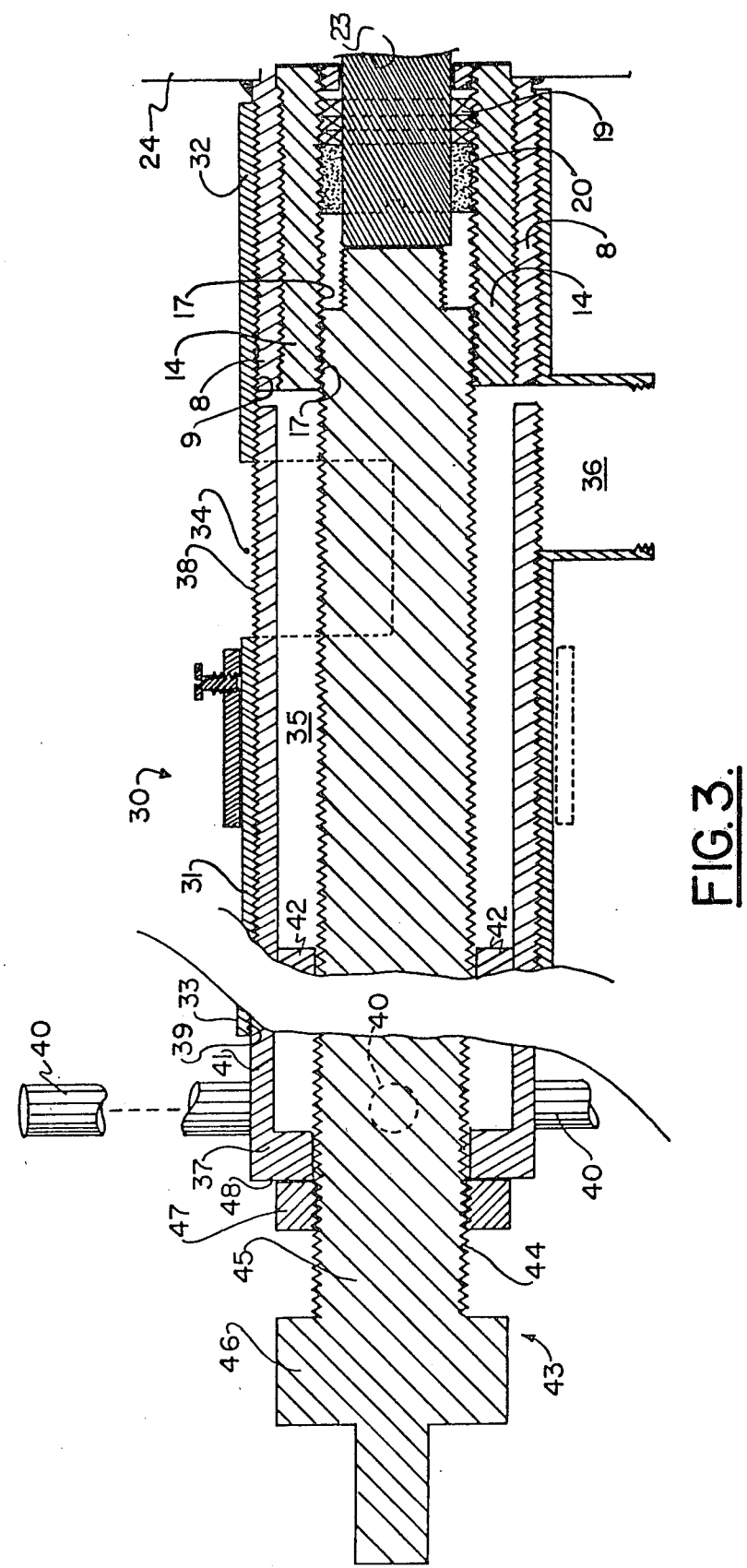
FIG. 3 is a cross-sectional view of a preferred embodiment of the thermoweld insertion support assembly.

The thermoweld insertion support assembly 30 is more clearly shown in FIG. 3. In a preferred embodiment, it comprises an outer hollow casing 31 having interiorly threaded opposite ends 32 and 33, one of which (shown as 32) mates with outer threads 9 of outer shell 8 of the coupling means 4. In this manner, thermoweld insertion assembly is securely attached to coupling means 4. Casing 31 is provided with opening 34 extending into its hollow cavity 35 and positioned near coupling means 4 in order that wrenches and other tools can be inserted therein to tighten packing gland nut 20, if desired. Casing 31 is also provided with a drain opening 36 should any material escape through coupling means 4 and into cavity 35. Thermoweld insertion support assembly 30 is also provided with an inner hollow casing 37 having exterior threaded surface 38 that mates with interior threads 39 of outer casing 31. Inner casing 37 is also provided with turning handles 40 attached to the exterior surface 41 at one end of inner casing 37 as shown. In a preferred embodiment, inner casing 37 is provided with stabilizing guides 42 to help hold in position thermoweld positioning rod that is insertable into cavity 35. Positioning rod 43 is provided with external threads 44 extending along the outer circumference of rod section 45 having a diameter that allows threads 44 to mate with threads 17 of valve seat retainer 14. Positioning rod 43 is also provided with turning shoulder 46 extending beyond rod section 45. Finally, positioning rod 43 is provided with lock nut 47 which is screwed about rod section 45 which can be screwed flush against shoulder surface 48 of end 37 of the inner casing to fix the relative position of the positioning rod 43 to the inner casing.

In operation, coupling means 4 with ball valve in a closed position is screwed onto pipe coupling 2. Next, outer casing 31 is screwed onto coupling means 4 and thermoweld rod 23 is inserted into cavity 35 which is aligned with caavities 10, 22 and 13. Thermoweld rod 23 is inserted through packing material 19 at which time packing gland nut is tightened to the desired degree. Ball valve 12 is then opened by the turning of valve stem 27. And thermoweld rod 23 is pushed through the ball valve 12 and into the pipe cavity 50 to the desired distance by screwing inner casing 41 into outer casing 31 and, finally, screwing in positioning rod 43 until thermoweld rod 23 is in the position desired. Thus, it can be seen that with the apparatus disclosed, thermoweld rod 23 can be accurately positioned where desired within pipe cavity 50.

There are, of course, other alternative embodiments not specifically disclosed, but which are obvious and intended to be included within the scope of the invention as defined by the following claims.

What I claim is:

1. A device for inserting a thermoweld into a pipe cavity comprising:
   (a) a coupling means attachable to said pipe, said coupling means having a sealable passageway of sufficient size to allow said thermoweld to pass through and be positioned in said pipe cavity;
   (b) a thermoweld insertion support assembly comprising:
      (i) an outer hollow casing attachable to said coupling means;
      (ii) a valve seat retainer screwingly attached to the inner surface of said hollow casing at its end adjacent said coupling means, said valve seat retainer having a hollow passageway through which said thermoweld can be inserted and into which is positioned packing material held in place by a packing gland nut so as to form a seal about said thermoweld when it is inserted through the hollow passageway of said valve seat retainer;
      (iii) a sealable opening is provided in said hollow casing at a position to the rear of said valve seat retainer, said opening being of sufficient size to allow the insertion of a wrench means operatingly attachable to said packing gland nut; and
      (iv) an inner hollow casing adjustably positionable inside said outer casing;
   and
   (c) a thermoweld positioning rod insertable into said inner casing and extendable to said coupling means.

* * * * *